United States Patent [19]

Victorovich et al.

[11] 4,358,430
[45] Nov. 9, 1982

[54] PROCESS FOR TREATMENT OF SELENIUM-BEARING MATERIALS

[75] Inventors: Grigori S. Victorovich, Mississauga, Canada; Ramamritham Sridhar, Madras, India; Malcolm C. E. Bell, Oakville, Canada

[73] Assignee: Inco Limited, Toronto, Canada

[21] Appl. No.: 311,164

[22] Filed: Oct. 14, 1981

Related U.S. Application Data

[63] Continuation of Ser. No. 151,349, May 19, 1980, abandoned.

[30] Foreign Application Priority Data

Jun. 14, 1979 [CA] Canada ................................. 329749

[51] Int. Cl.³ .............................................. C01B 19/00
[52] U.S. Cl. ........................................ 423/508; 75/99; 75/3; 23/313 FB
[58] Field of Search ............... 75/3, 99; 423/508, 509, 423/510; 23/313 P, 313 FB

[56] References Cited

U.S. PATENT DOCUMENTS

| 2,048,563 | 7/1936 | Poland | 423/510 |
| 2,378,824 | 6/1945 | Betterton et al. | 423/510 |
| 2,592,421 | 4/1952 | Heilmann | 75/3 |
| 2,948,591 | 8/1960 | Handwerk | 423/509 |
| 2,981,603 | 4/1961 | Tuwiner | 423/510 |
| 3,231,413 | 1/1966 | Berquin | 23/313 FB |
| 3,533,829 | 10/1970 | Quanquin | 23/313 FB |
| 3,627,486 | 12/1971 | Nakano | 423/509 |
| 3,816,074 | 7/1974 | Low | 75/3 |
| 4,094,668 | 6/1978 | Yannopoulos et al. | 75/99 |

FOREIGN PATENT DOCUMENTS

| 1243101 | 6/1967 | Fed. Rep. of Germany | 423/510 |
| 1176661 | 1/1970 | United Kingdom | 423/509 |

OTHER PUBLICATIONS

J. H. Schloen et al., "Treatment of Electrolytic Copper Refining Slimes" in *J. of Metals*, No. 5, pp. 764–777 (1950).

D. M. Chizhikov et al., "*Selenium and Selenides*", Collet's (Publishers) Ltd., London and Wellingborough, pp. 57–115 (1968).

A. A. Kudryavtsev, "*The Chemistry and Technology of Selenium and Tellurium*", Collet's (Publishers) Ltd., London and Wellingborough, pp. 189–205 (1974).

R. A. Zingaro et al. (Ed.), "Selenium", Van Nostrand Reinhold Company, pp. 31–60 (1974).

W. J. Mead (Ed.), "*The Encyclopedia of Chemical Process Equipment*", Reinhold Publishing Company, pp. 48–49 (1964).

O. S. North, "*Mineral Exploration, Mining, and Processing Patents, 1970*", p. 184 (abst. of Russian Pat. No. 225,448).

Chem. Abst., vol. 31, 3222[6] (1937).

Chem. Abst., vol. 29, 3792[1] (1935).

H. B. Ries, "*Granulaterzeugung in Mischgranulatoren und Granuliertellern*", Aufbereitungs Technik, No. 12, pp. 639–646 (1975).

R. K. Monahan and F. Loewen, "Treatment of Anode Slimes at the Inco Copper Refinery", presentation at the 1972 Annual Conference of the CIM, Aug. 27–30, 1972, Halifax, Canada.

Primary Examiner—Brian E. Hearn
Attorney, Agent, or Firm—Miriam W. Leff; Raymond J. Kenny

[57] ABSTRACT

Selenium-bearing materials are treated to convert selenium values to water-soluble form in a process which comprises producing a wet pellet product of uniform composition having a specified moisture content and size from an aqueous slurry containing the selenium-bearing material and dissolved sodium carbonate-containing reagent. In a preferred embodiment the slurry is pH-adjusted to neutralize free acid and/or to precipitate nonferrous base metals.

25 Claims, No Drawings

PROCESS FOR TREATMENT OF SELENIUM-BEARING MATERIALS

This is a continuation of application Ser. No. 151,349 filed May 19, 1980, abandoned.

This invention relates to a process for treating selenium-bearing materials. More particularly it concerns an improved method of treating anode slimes with soda ash to convert selenium values in the slimes to a water soluble form.

BACKGROUND OF THE INVENTION

Most selenium is obtained commercially from various selenium-bearing materials which are by-products of other metallurgical or chemical processes. The materials are, for example, slimes, sludges, muds, dust and the like in which selenium is concentrated along with other valuable elements such as tellurium, silver, gold and platinum group metals. The method selected to extract the selenium from a material will depend on such factors as its composition, the form in which the selenium is present, availability of reagents, cost, and environmental considerations. Details on many processes now in use are given in books such as "Selenium", Ed. by R. A. Zingaro, pp. 31–60, (1974) and "Selenium and Selenides" by D. M. Chizhikov et al. pp. 57–115, (1968), "The Chemistry and Technology of Selenium and Tellurium" by A. A. Kudryavtsev, pp. 189–205, (1974) and in articles such as "Treatment of Electrolytic Copper Refining Slimes", by J. H. Schloen et al, J. of Metals, No. 5, pp. 764–777, (1950).

Since the most important source of selenium at the present time is anode slimes from electrolytic copper refining, the present invention will be discussed below with reference to the treatment of anode slimes. The principal methods of treating such slimes often include a preliminary decopperization step. One method for decopperization, for example, consists of treating the slimes with strong sulfuric acid at an elevated temperature. This method gives good copper extraction, decreases the total amount of material to be treated for selenium extraction, and increases the selenium content. The present method is particularly suited to slimes which have had an acid pretreatment. It is also particularly suitable for treating selenium-bearing material which also contains silver. Thus, the method of the present invention is discussed with particular attention to slimes which have been treated with sulfuric acid and which contain silver.

In one of the conventional routes for treating copper refinery slimes, the raw or decopperized slimes are mixed with soda ash and then roasted in an oxidizing atmosphere to convert selenium to water-soluble sodium selenite or selenate, which can then be leached. Selenium is recovered from the leach liquor by a number of known techniques. It has been recognized that this route requires a very intimate mixing of the selenium-containing particles with soda ash, a sufficient and continuous supply of oxygen reaching all the particles, and careful control of temperature so as to avoid a fusion which would prevent oxygen from penetrating the material. It is also necessary to provide sufficient soda to convert all the oxidized selenium to a nonvolatile, water soluble selenite and/or selenate, so as to prevent selenium oxide volatilization.

Attempts have been made to provide the above requirements. U.S. Pat. Nos. 2,948,591 and 2,981,603, for example, disclose processes in which agglomerates are formed of the anode slimes and soda ash. However, the methods of these patents have shortcomings, particularly for anode slimes which have been decopperized by treatment in a strong solution of sulfuric acid. The processes of both patents involve forming mixtures of a pasty consistency out of which agglomerates are formed. This technique is suitable for processing dry materials and not applicable for treating wet selenium-bearing material containing sulfuric acid. Also the processes proposed by the two patents do not apply to materials in which the selenium is present mainly as both elemental selenium and silver selenide.

With respect to the slimes containing sulfuric acid, whatever the amount present, the $H_2SO_4$ consumes the alkali carbonate, e.g. soda ash, which is added. Also, the soda interacts readily with many other sulfates, particularly sulfates of copper, nickel, iron, cobalt, lead, calcium, etc. All such reactions lead to conversion of the soda into sodium sulfate, which, in turn, is of no use for the formation of the water soluble selenium compounds during roasting. In addition, the actual amount of soda left to react with selenium oxides becomes unknown. Furthermore, it is impractical to mix the wet selenium-bearing slimes containing sulfuric acid with the alkali metal compounds needed for the roasting. Mixing $Na_2CO_3$ and/or NaOH with the wet slimes containing $H_2SO_4$ releases a large amount of heat due to neutralization of the $H_2SO_4$ and, the mixture swells out because of $CO_2$ evolution when $Na_2CO_3$ is added, or it gets more moist with $H_2O$ formed when NaOH is used. Also, the mixture sputters, contaminating the surroundings, as a consequence of either the $CO_2$ evolution or steam generation. In either case, the heat of the sulfuric acid neutralization is capable of raising the temperature of the mixture up to the point where elemental selenium oxidation becomes possible, i.e. slightly above 200° C. This highly exothermic oxidation to $SeO_2$ tends to proceed so fast that the heat developed cannot be dissipated readily, and the temperature continues to rise. As a result it is not possible to achieve good mixing and there is a danger of $SeO_2$ volatilization.

There is also the danger of $SeO_2$ volatilization when the selenium is present mainly as elemental selenium and silver selenide. This is caused by the different conditions under which the elemental selenium and silver selenide react to form $SeO_2$. It is well known that pure silver selenide is quite resistant to air oxidation up to 400° C. while elemental selenium is oxidized and even can ignite slightly above 200° C. There is no clue in either of the aforementioned patents on how to provide for completing all the chemical reactions involved while keeping the $SeO_2$ from volatilizig.

Furthermore, while pure silver selenide is resistant to oxidation below 400° C., at higher temperatures, especially at about 500° C., it can readily form silver selenite, $Ag_2SeO_3$, which is known to melt at about 530° C. and decompose at 550°–700° C. When other compounds are present melting of silver selenite may occur at even lower temperatures, thereby obstructing oxidation. Another cause of disruption in oxygen supply may be the larger molar volume of sodium selenite and/or selenate formed as compared with sodium carbonate consumed. Both phenomena become real obstacles to complete oxidation when the selenium-bearing materials have Se and Ag contents somewhat above 10% each. They are not harmful when the materials contain about 8–10% or less of selenium and silver.

OBJECTS OF THE INVENTION

It is an object of the present inventon to provide a simple, convenient and efficient method for treating selenium-bearing materials to convert selenium values to water soluble form while minimizing volatilization of selenium to the environment. Another object is to produce such pellets from an aqueous slurry containing selenium-bearing material and soda which will ensure substantially complete conversion of selenium values to water soluble compounds during roasting.

These and other objects are achieved in the process of the present invention as will be described below.

SUMMARY OF THE INVENTION

According to the present invention a selenium-bearing material is treated to produce pellets which are characterized in that they are particularly suitable for the conversion of selenium values to water soluble form by a process comprising forming an aqueous slurry of the selenium-bearing materials and a sodium carbonate-containing reagent, the water content of the slurry being at least 30% by weight and at least sufficient to dissolve a preponderant part of the sodium carbonate-containing reagent; continuously feeding the aqueous slurry to a heated pelletizing means having a hot agitated pellet bed to produce pellets from the slurry, said pellet bed being maintained at a temperature of between 60° C. and about 120° C.; and maintaining said pellets on the heated pelletizing means for a period of time to develop a wet pellet product having a pellet size not greater than about 30 mm.

To convert the selenium values to water soluble form the wet pellet product is dried and then roasted. Roasting is carried out at about 350° C. to about 500° C. The roasted pellets may be water leached to extract selenium.

In another aspect of the invention, the selenium-bearing material may contain free acid and/or one or more of nonferrous base metal values, e.g. nickel, copper, cobalt or lead, and it is a feature of the present invention to adjust the pH of the slurry to neturalize free acid and/or to precipitate nonferrous base metals before the sodium carbonate-containing reagent is added. After neutralization the sodium carbonate-containing reagent is added for appropriate Na:Se ratio, then the slurry is fed to the heated pelletizer.

In the above description of the process the sodium carbonate-containing reagent preferably comprises soda ash. Sodium bicarbonate and sodium nitrate may also be present, as will be discussed in more detail below, a "preponderant amount" means greater than 50%, and "slurry" means having a watery or fluid consistency as opposed to, for example, a pasty consistency.

The present process has many advantages. It provides a simple and convenient technique for handling selenium-bearing materials, regardless of the composition of the material, particularly when sulfuric acid is present. This technique, for example, eliminates the need for several preliminary operations such as washing, settling and/or filtration and/or evaporation, and drying before the slimes are mixed with soda and the mixture is agglomerated. It also provides for efficient processing of selenium-bearing materials which contain elemental selenium and silver selenide in any proportion, and efficient control over the soda necessary for the formation of water soluble compounds of selenium. It permits the production of pellets which have very high percentage of porosity (e.g. up to 50%), uniform blending of all the constituents, and very good compressive strength, a combination which ensures complete conversion of selenium values to water soluble state during roasting with minimal dusting. Another major advantage is that the process can be carried out with negligible selenium losses to the gas phase during roasting along with almost complete selenium extraction during water leaching irrespective of the selenium content of the selenium-bearing materials.

PREFERRED EMBODIMENTS OF INVENTION

The selenium-bearing materials, e.g. raw anode slimes of electrolytic copper refining, decopperized anode slimes of the same origin, sludges, muds, dusts, residues of hydrometallurgical processing, some intermediates of metallurgical production and beneficiation and the like, are slurried in water or in a water solution containing valuable elements, for instance, in scrubber solution from waste gas cleaning.

The pH of the slurry is adjusted to neutralize free acid and precipitate water insoluble compounds of non-ferrous base metals, for example, copper, nickel, cobalt, lead and etc, with additions of appropriate neutraizers such as hydroxides or carbonates of alkali and/or alkaline earth metals. Preferably soda ash is used as the neutrlizing agent. If copper is present, for example, the pH is raised to about 3.5 to 5.5, if nickel is present the pH is raised to about 4.5 to 6.5, if cobalt is present the pH is raised to about 5.5 to 7.5. Preferably, when such base metals are present neutralization of the slurry is to a pH of about 6.5 to 7.5. In the absence of base metals neutralization is to a pH of not less than about 2.

The neutralized slurry is then mixed with a sodium carbonate containing reagent, preferably comprising soda ash, in the molar proporation of Na:Se of at least about 1.8:1 but not more than about 3.0:1, preferably about 2 to 2.5. When an appreciable amount of tellurium is present, then the molar proportions should be with respect to selenium plus tellurium. Some part of the sodium carbonate can be substituted by equivalent amount of sodium bicarbonate and/or sodium nitrate . Up to about 50 equivalent % of sodium bicarbonate and up to about 10 equivalent % of sodium nitrate are considered reasonable. Partial replacement of the sodium carbonate by sodium bicarbonate helps in obtaining a pellet product with higher moisture. Moreover, sodium bicarbonate decomposes at low temperature of about 160° C. to about 190° C. with evolution of $CO_2$ and $H_2O$, thereby providing additional porosity needed for oxidation of selenium and its compounds. Sodium nitrate is recommended particularly when selenium-bearing materials contain large amounts of elemental selenium. While in the reagent compounds any alkali metals can be used in place of sodium, the sodium compounds are the only practical ones for reasons of availability and cost. For that reason the alkali metal-containing reagent components are referred to herein as the sodium compounds.

The final slurry produced after neutralization and addition of the sodium carbonate-containing reagent must be fluid enough for stirring and pumping by conventional devices used in hydrometallurgy. It must contain, at least about 30 wt. % of water in which a preponderant amount, (i.e. more than about 50%) of the aforesaid sodium carbonate-containing reagent should be dissolved. Preferably the water content of the final slurry fed on the heated pelletizer is about 40 to 50 weight % H₂O. In order to use minimum amount of water and have most of the sodium compounds dissolved, the temperature of final slurry is maintained about 40° C., preferably the temperature of the final slurry is 40° to 60° C. It is preferred that most of the sodium carbonate-containing reagent added to the neutralized slurry be in solution and, if needed, water can be added to achieve this.

The final slurry is then continuously fed on a bed of hot pellets which are agitated on a pelletizer. A rotary disc, rotary cone or rotary drum may be used as the pelletizer. Any conventional pelletzing device may be used. However, such pelletizer must be equipped with a source of heat to maintain the temperature of the agitated pellets at a temperature above about 60° C. and below about 120° C., preferably between 80° or 85° C. and 100° C. Below 80°-85° C. the moisture does not evaporate fast enough and the pellets may lump together. Above about 120° C. because of overheating pellets of the qualities described above will not be obtained. Leaching of Se becomes more difficult since, e.g., the pellets tend to become too dense for good oxygen penetration during roasting and selenides may form which remain unoxidized in the core of the pellets.

As a source of heat, the pelletizer can be provided, for example, with electrical heaters installed at the bottom and/or walls of the disc, cone or drum, heating them on the outside to a temperature from about 300° C. to about 600°-800° C. In general, any kind of heat supply can be used to maintain the above temperature of the bottom and/or walls of the pelletizer. Additionally, infrared lamps can be positioned above the pellet bed so that the necessary heat will be supplied to the pellet bed not only through the walls and bottom of the pelletizer but also by direct radiation from the infrared heaters. A stream of hot gases directed onto the bed can also be used to help maintain the required temperature of the pellets.

The final slurry is fed on to the hot pellet bed, preferably through a tube and dispersed (rather than poured as a continuous flow onto the same spot) to avoid agglomeration of the pellets into big lumps or clusters.

If a pelletizing disc is used, then small pellets and/or seed solids (nuclei) are known to stratify to the bottom of the pelletizer and are retained on the latter for further growing, while the larger pellets migrate to the surface of the bed at the ower side of the disc and are discharged over the rim when they reach certain size within a quite narrow size range. Due to this auto-classification, the small pellets and/or seed solids, the finished larger pellets and the pellets of the intermediate size form an open structure, like a lady's open fan, in a pattern which shows the material in progress. This, in turn, makes it possible and necessry to disperse most of the final slurry selectively onto the seed solids and the pellets of small and intermediate size thereby providing thier uniform growth.

When a pelletizing drum or cone is used, then the slurry feed has to be distributed along the pelletizer axis so that the seed solids and the smaller pellets grow when they gradually travel toward the discharging end of the pelletizer.

When the final slurry gets onto the hot agitated pellet bed, it covers the individual hot pellets and seed solids with a thin layer, and then some part of water of the slurry evaporates from this layer. As a result of such evaporation, salts (e.g. sodium carbonate, bicarbonate and nitrate) present in the aqueous phase of the final slurry crystallize out forming on the surface of the pellets a new layer of a very-well blended, pelletized mixture of the solid selenium-bearing particles with the reagent crystals. Thus, the final fluid slurry turns into pellets which have a substantially spherical shape and are sufficiently strong to handle.

In general, nuclei may be obtained immediately on the hot pelletizer by scraping off the solids being precipitated on the hot surfaces due to evaporation of the water of the slurry, or nuclei forming material may be purposely charged onto the pelletizer to provide better control over the size of the pellet product. For instance, it is particularly convenient for this purpose to use some part of the solid residue obtained after the leaching of the roasted pellets.

It has been found that to obtain suitable pellets the hot pelletization must be carried out with a balanced combination of parameters, particularly temperature of and residence time on the hot pelletizer. In general, the wet pellet product should not have a larger pellet size than about 30 mm preferably less than 20 mm and typically the mean pellet size is about 5 to about 15 mm, and the moisture content of the pellets should be above 10%, preferably about 15 to about 25%, based on the total weight of the freshly obtained pellets. In general, this can be achieved at a temperature of, preferably, about 85°-100° C. in about 15 to 30 minutes. The higher moisture content is necessary to obtain pellets with high microporosity upon subsequent drying of the pellets. High microporosity, in turn, permits access of oxygen to the core of the pellets. This is essential for complete conversion of the selenium values to water soluble compounds.

It will be noted that other parameters in the pellet bed may influence the pellet formation such as rotation speed and angle of inclination of the pellet bed, amount of nucleating agents, etc., and one skilled in the art can make accommodations for such variations without departing from the scope of this invention.

The wet pellet product is dried and roasted in an atmosphere containing free oxygen, for instance in air. Drying can be carried out as a separate operation, in which the drying temperature should not exceed about 200° C. to avoid ignition of elemental selenium and self heating the pellets. Drying and roasting can be also accomplished in a single operation. In this case, the moist pellet product must be heated to the roasting temperature at an average rate of less than about 20° C./min, preferably about 3°-6° C./min. It is most essential to slowly heat the pellet product between about 200° C. and roasting temperature.

The dried pellet product is roasted between about 350° and about 500° C., preferably between about 380° C. and about 450° C. for sufficient length of time to convert most of the selenium into water soluble state. High microporosity of the dried pellets leads to minimizing the roasting time and to improved oxidation. Preferably the free oxygen-bearing gas phase used for roasting is supplied counter currently to fresh pellets entering a roaster.

The calcine obtained after roasting the pellets is then leached in water and the leached solution and solid residue can be further processed in conventional ways for the recovery of selenium and other elements such as tellurium, silver and platinum group metals. Several methods are shown in the aforementioned books and article.

It will be noted that the present method deals with the problem of H₂SO₄ content and the sulfates of the nonferrous metals by first adjusting the slurry pH to neutralize free acid and precipitate such nonferrous metal before mixing the slurry with the sodium carbonate needed during the roasting stage, thereby controlling the amount of sodium carbonate-containing reagent required to react with the selenium-bearing particles. In the present method the problem of heat and gas generation when mixing $H_2SO_4$-containing slimes with sodium carbonate is avoided because the neutralization is carried out in the pulp. Rather than being a problem, the heat of neutralization is employed to maintain the pulp temperature above 40° C., thereby helping to keep dissolved the sodium carbonate-containing reagent. Thereafter, when pelletizing is carried out on the heated pelletizer, the dissolved alkali metal compounds crystallize out of the liquid, thus providing a very even mutual mixing of the selenium-bearing solid particles and the sodium carbonate-containing reagent, which minimizes the hazard of $SeO_2$ volatilization and insures the completion of the chemical reaction involved. In this way the present method insures that the necessary amount of sodium carbonate and its equivalents is present with the appropriate accuracy and within specific limits to react with all the oxidized selenium to form non-volatile and water soluble sodium selenite and/or selenate.

It will also be noted that the aforementioned difference in oxidation behavior of elemental selenium and silver selenide is dealt with in the present method by slowly heating the pellet product to the roasting temperature, especially, from 200° C. and up when only elemental selenium starts oxidizing. Most of $SeO_2$ thus formed by oxidation of elemental selenium is converted into the sodium compounds under conditions when silver selenide is not oxidized as yet and, therefore, greater excess of the free soda ash is available per unit of elemental selenium. The greater excess of free soda is necessary for the temperature range between about 200° C. and the temperature at which silver selenide starts oxidizing because at this low temperature the efficiency of soda for reaction with $SeO_2$ is rather low, therefore, selenium oxide can escape the system as $SeO_2$ gas if the soda excess is not adequate.

In the course of slow heating, when oxidation of silver selenide becomes possible at higher temperature, soda ash, even partially converted into the selenium-containing compounds, acquires much greater capacity for selenium oxide and can be converted into sodium selenite and/or selenate with much greater efficiency thereby preventing the expulsion of selenium dioxide vapor resulting from silver selenide oxidation. Thus, both forms of selenium, namely, elemental selenium and selenium of $Ag_2Se$, become converted into the desirable water soluble compounds without losses to the atmosphere.

The invention is further illustrated by the following examples.

EXAMPLE I

A filter cake, after decopperization of raw anode slimes of copper electrolytic refining with strong sulfuric acid, was of the following composition, wt. %:

| Se | Te | Cu | Ag | Pb | SiO₂ | H₂SO₄ | H₂O | H₂O Insolubles |
|---|---|---|---|---|---|---|---|---|
| 19.8 | 0.43 | 1.67 | 16.1 | 4.0 | 8.26 | 14.5 | 24.8 | 59.4 |

This material had a consistency of thick paste and was difficult to handle.

One hundred weight parts of this cake were slurried with 50 weight parts of water, and a fluid slurry convenient for stirring was obtained thereby. Then, soda was gradually added to it to bring pH of the slurry up to 7.5.

The neutralized slurry was then mixed with 67 weight parts of soda, and water content of the final slurry was adjusted to about 45 wt. %.

Molar ratio of soda to selenium plus tellurium in the final slurry was 2.5.

The final slurry was the continuously fed on a hot disc pelletizer, the temperature of the pellet bed on which was maintained near 97° C. The slurry was being fed at such flow rate that mean residence time of the pellet being formed on the disc was about 25 minutes.

The pellet product was produced with mean size near 11 mm, and an average pellet moisture upon drying at 110° C. was 15.1–16.2 wt. %.

This product was dried at a temperature somewhat below 200° C. The dry pellets were roasted in air atmosphere at temperature 400°–450° C. The unground roasted pellets were then leached in hot water for 1 hour.

Three roasting tests using the pellets the size of −6.7+4.7 mm showed the selenium recovery of 87.4, 92.6 and 98.8% after 1, 2 and 4 hours, respectively, while selenium losses to the gas phase were well below 0.1% of total selenium regardless of roasting duration.

When roasting the pellets, the size of −4.7+3.4 and −12.7+6.7 mm at the same temperature during 4 hours, the selenium recovery reached 99.0 and 98.9%, respectively, thus confirming very high quality and suitability of the pellets for roasting and subsequent water leaching.

EXAMPLE II

A sample of decopperized slimes having the same composition as that of Example I, was slurried in water and soda was added as described in Example I, except that the molar ratio of soda to selenium plus tellurium in the final slurry was 1.7 and the pellet product produced had an average moisture content of 12.2 wt. %. Thereafter the product was dried, roasted and leached in the same manner as Example I.

The pellets, having a size of −6.7+3.4 mm, showed the selenium recovery of 66.3, 70.1, 80.2 and 82.4% after 1, 2, 4 and 8 hours, respectively, while selenium loss to the gas phase after 4 hour roasting was 1.12%. Increasing the roasting temperature from 400°–450° to 550° C. increased the losses up to 1.7% while the selenium recovery dropped to 50.3% after the same 4 hour roasting.

This example illustrates an importance of having appropriate soda addition recommended in this invention.

EXAMPLE III

The filter cake from Example I was water washed to obtain insoluble residue (59.4 wt. % of the cake). The insoluble dry residue was studied under microscope, electron probe and by XRD (X-Ray Diffraction) analysis. It was found that most of the selenium was present as $Ag_2Se$ and elemental Se.

The residue was then subjected to DTA (Differential Thermal Analysis) and TGA (Thermal Gravimetric Analysis) analysis using air atmosphere. It was determined that elemental selenium begins igniting at temperature of 200°–220° C. and, thereafter, at temperature of 260°–300° C., selenium oxide formed begins to volatilize intensively. Silver selenide begins oxidizing at 410°–420° C.

It was also found that $SeO_2$ and $Na_2CO_3$ start interacting at the temperature somewhat above 100°–110° C., but even with 50% excess of soda, the reaction does not proceed to completion before the temperature is raised to 350°–380° C.

This example shows that drying of the pellet product must be carried out at the temperature which does not exceed 200° C. Otherwise, elemental selenium is rapidly oxidized and selenium dioxide formed is volatilized. Also it shows that only the use of a high excess of soda can prevent selenium dioxide volatilization at the temperature below 350°–380° C.

This demonstrates the importance of using the molar ratio of $Na_2CO_3$ to Se recommended in the present method.

Example IV

The wet pellet product produced from a material having the same composition as that of Example I, was treated in the same manner as described in Example I, but the pellet size was $-4.7+3.4$ mm, with an average pellet moisture of only 7.3 wt. %. After 1, 4 and 8 hour roasting at 400°–450° C., the selenium recovery was only 38.7, 69.1 and 72.3%, respectively.

When moisture of the wet pellet product was less than optimum, then formation of lead selenide was observed confirming low viscosity of the pellets and blockage of the pellet core from oxygen penetration.

Using $NaHCO_3$ instead of part of the soda, all other things being equal, produces a wet pellet product with the desired high moisture content of 22–23 wt. %, thereby helping to provide better transport of gaseous constituents when this moisture is gone. Heat treating such pellets yield selenium extractions greater than 95%.

EXAMPLE V

The pellets, the size of $-3.4+1.7$ mm, produced from a material and process shown in Example I, were roasted during 2 hours at 550° C.

Selenium extractions were 88.9, 93.6 and 96.4% at the heat rate 17°, 8.8° and 4.4° C./min., respectively.

If the same pellet product was roasted at 550° C. in preheated furnace for 4 hours, the selenium recovery was only 86–92%.

This example shows the importance of slow heating rate to achieve good selenium extraction.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. In a process for treating a selenium-bearing material to convert selenium values to water soluble form, the improvement which comprises forming an aqueous slurry of the selenium-bearing material; adding a sodium carbonate-containing reagent to the slurry, the water content of the resultant slurry being at least 30% by weight, based on the total weight of the slurry, and at least sufficient to dissolve a preponderant part of the sodium carbonate-containing reagent; continuously feeding the resultant slurry to a heated pelletizing means to form pellets from the resultant slurry, said pelletizing means having a hot agitated pellet bed and said pellet bed being maintained at a temperature of between about 60° C. and about 120° C. during formation of the pellets; and maintaining a residence time of said pellets in the heated pelletizing means sufficient to produce a wet pellet product having a pellet size not greater than about 30 mm.

2. The process according to claim 1, wherein the selenium-bearing material comprises decopperized anode slimes which contain sulfuric acid.

3. The process according to claim 1, wherein the selenium-bearing material contains free acid and/or sulfates of nonferrous base metals and the slurry is pH-adjusted to neutralize free acid and/or precipitate such nonferrous base metals prior to adding sodium carbonate-containing reagent.

4. The process according to claim 3, wherein pH adjustment of the slurry is effected with a neutralizing agent comprising sodium carbonate.

5. The process according to claim 3, wherein the selenium-bearing material contains at least one of the nonferrous base metals copper, nickel, cobalt and lead.

6. The process according to claim 1, wherein the aqueous slurry is pH-adjusted from about 5.5 to about 7.5 before adding the sodium carbonate-containing reagent.

7. The process according to claim 1, wherein the selenium-bearing material may contain tellurium and the sodium carbonate-containing reagent is added to the aqueous slurry in an amount to provide sodium:selenium+tellurium (if present) in the ratio of about 1.8:1 to about 3.0:1.

8. The process according to claim 7, wherein the ratio of Na:Se (±tellurium) is about 2:1 to 2.5:1.

9. The process according to claim 1, wherein the sodium carbonate-containing reagent comprises soda ash.

10. The process according to claim 1, wherein the sodium carbonate-containing reagent contains up to about 50 equivalent % of sodium bicarbonate and up to about 10 equivalent % of sodium nitrate.

11. The process according to claim 1, wherein the water content of the aqueous slurry is about 40% to about 50%, based on the total weight of the slurry.

12. The process according to claim 1, wherein the temperature of the slurry is above about 40°.

13. The process according to claim 1, wherein the pellet bed temperature is about 85° to about 100° C.

14. The process according to claim 1, wherein the residence time is about 15 to about 30 minutes.

15. The process according to claim 1, wherein the mean size of the wet pellet product is about 5 to about 15 mm.

16. The process according to claim 1, wherein the wet pellet product has a moisture content of above 10 weight % based on the total weight of the wet pellet product.

17. The process according to claim 16, wherein the moisture content of the wet pellet product is about 15 to about 25 weight %.

18. The process according to claim 1, wherein the wet pellet product is dried and roasted and roasting is carried out in an oxygen-containing atmosphere at a temperature of about 350° C. to about 500° C. to convert selenium values to a water soluble form.

19. The process according to claim 18, wherein drying and roasting of the wet pellet product are carried out in a single operation and the moist pellet product is heated to roasting temperature at an average rate of less than 20° C. per minute.

20. The process according to claim 18, wherein the wet pellet product is dried prior to roasting and the drying temperature is below about 200° C.

21. The process according to claim 20, wherein after drying the temperature is gradually raised to the roasting temperature at about 3° to 6° C. per minute.

22. The process according to claim 18, wherein the roasting temperature is about 380° C. to about 450° C.

23. The process according to claim 1, wherein the selenium-bearing material contains silver.

24. In a process for treating a selenium-bearing material, which may contain one or more of the values selected from tellurium, silver and nonferrous base metals such as copper, nickel, cobalt and lead, by roasting with soda ash to convert selenium values to a water soluble form, the improvement which comprises:

a. forming a slurry of the selenium-bearing material in an aqueous medium;
b. adjusting the pH of the slurry to neutralize free acid (if present), and precipitate nonferrous base metals (if present);
c. adding a sodium carbonate-containing reagent to the slurry in an amount to provide a final slurry containing sodium; selenium+tellurium (if present) in a molar ratio of about 1.8:1 to about 3:1, the water content of said final slurry being at least 30 wt. % and at least sufficient in an amount to dissolve a preponderant amount of the sodium carbonate-containing reagent;
d. continuously feeding the final slurry to a heated pelletizing means to form pellets from the slurry, said pelletizing means having a hot agitated pellet bed and said pellet bed being maintained at a temperature of between about 60° C. and 120° C., and maintaining a residence time of the pellets on the heated pelletizing means sufficient to produce a wet pellet product having a pellet size not greater than about 30 mm and having a moisture content of at least about 10% by weight; and
e. drying and then roasting the wet pellet product, the roasting being carried out in an oxygen-containing atmosphere at a temperature of about 350° to 500° C. to convert selenium values to a water soluble form.

25. The process according to claim 24, wherein the roasted pellets are water leached to extract selenium.

* * * * *